United States Patent
Ishihara

(10) Patent No.: US 6,449,222 B2
(45) Date of Patent: Sep. 10, 2002

(54) SERVO CONTROL APPARATUS AND METHOD UTILIZING A LIGHT SPOT SHIFTED BEYOND A SIGNAL CHANGE AREA OF AN INFORMATION RECORD MEDIUM

(75) Inventor: Kanji Ishihara, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/793,583

(22) Filed: Feb. 27, 2001

(30) Foreign Application Priority Data

Feb. 28, 2000 (JP) ........................................ 2000-056065

(51) Int. Cl.7 ............................................. G11B 17/22
(52) U.S. Cl. ................ 369/30.1; 369/47.38; 369/53.25; 386/126
(58) Field of Search ............................ 369/30.1, 47.38, 369/53.25, 44.27; 386/126

(56) References Cited

U.S. PATENT DOCUMENTS 5,708,632 A * 1/1998 Totsuka et al. ................ 369/32

FOREIGN PATENT DOCUMENTS

| JP | 63-251966 | * 10/1988 |
| JP | 11-7737 | * 1/1999 |
| JP | 2000-173206 | * 6/2000 |

* cited by examiner

Primary Examiner—Aristotelis M Psitos
(74) Attorney, Agent, or Firm—Morgan, Lewis & Bockius LLP

(57) ABSTRACT

A servo control apparatus for carrying out a servo control when information is reproduced from an information record medium having an embossed area where information cannot be recorded, such as DVD-RW, is provided. The servo control apparatus detects a position of a light spot formed by the light beam except the embossed area on the information record medium, and shifts the light spot beyond the embossed area to a predetermined target position to be radiated with the light beam, which is positioned in another side of the embossed area on the information record medium, on the basis of the detected position.

14 Claims, 4 Drawing Sheets

SERVO CONTROL APPARATUS AND METHOD UTILIZING A LIGHT SPOT SHIFTED BEYOND A SIGNAL CHANGE AREA OF AN INFORMATION RECORD MEDIUM

BACKGROUND OF THE INVENTION

1. Field of the Invention

The present invention relates to a servo control apparatus, a servo control method, and an information reproducing apparatus, and more particularly relates to a servo control apparatus for and a servo control method of carrying out a servo control when information is optically reproduced from an information record medium, such as an optical disc, etc., and an information reproducing apparatus having the same.

2. Description of the Related Art

In recent years, a so-called DVD having a record capacity increased by several times that of a conventional CD (Compact Disc) has been widely generalized as an information record medium on which image and audio information whose amount corresponds to that in one movie can be recorded.

Recently, in addition to the specifications for a read-only DVD currently getting generalized, specifications for a so-called DVD-RW (hereafter, the specifications are merely. referred to as DVD-RW specifications) are being established as specifications for. a DVD that allows recording and reproducing of the information a plurality of times, and reproducing of the information even if it is used in an information reproducing apparatus for the read-only DVD.

In the DVD-RW specifications currently being established, a groove track meandering at a constant frequency is formed on the DVD-RW as an information track where the information is optically recorded and reproduced.

The groove track is meandered to generate a reference recording clock signal having an accurate frequency synchronized with a rotation of the DVD-RW by detecting the frequency of meandering at the time of recording the information on the DVD-RW.

The DVD-RW basically has a recording capacity substantially equal to that of the read-only DVD. Thus, unauthorized duplication of the image information, etc. recorded in the read-only DVD can be done.

However, the image information, etc. recorded in the read-only DVD is usually protected by the Copyright Act. Thus, the rampancy of the unauthorized duplication as mentioned above is extremely disadvantage for the owner of the copyright.

Therefore, as a countermeasure against the unauthorized duplication, the DVD-RW specifications specifies that an area on the DVD-RW corresponding to an area in which a control information for reproduction control is recorded in the read-only DVD, is defined as a non-recordable area (hereafter, referred to an embossed area).

Incidentally, in the information reproducing apparatus for an actual DVD-RW, it is desirable that information recorded on an optical disc expect the DVD-RW, namely, CD, the read-only DVD, a DVD-R (DVD-Recordable) on which an information can be recorded only one time, etc., can be also reproduced by the information reproducing apparatus.

In the case when the information recorded on the various optical discs is respectively reproduced in the above-mentioned information reproducing apparatus having a so-called high compatibility, it is required that servo control, such as a so-called tracking servo control, focus servo control, etc. is performed. Thus, when the reproduction is started, it is necessary to carry out start processing for starting the servo control, and then set a servo loop at a closed state.

At this time, the start processing needs to use a detection signal from each optical disc, such as a reproduction RF signal, etc. However, if one information reproducing apparatus reproduces the information from the various optical discs as the above-mentioned case, it is necessary to carry out the start processing by first radiating a light beam to a position on the optical disc (hereafter, merely referred to a common detection position) at which the detection signal is obtained in all kinds of optical discs.

Here, according to the specifications of each optical disc, an outer position 25 mm away from a center of each optical disc corresponds to the above-mentioned common detection position.

Therefore, the information reproducing apparatus having the above-mentioned compatibility first emits a light beam to an outer position 25 mm away from a center of an loaded optical disc, and thereby obtaining a detection signal, and then carries out the start processing by using it.

Then, the reproduction of the information recorded on the DVD-RW is performed. The DVD-RW specifications specifies that the embossed area is positioned inside the common detection position and at the time of the reproduction for the DVD-RW it is necessary to obtain the reproduction control information recorded in a certain area inside the embossed area. A record position on the DVD-RW of the reproduction control information is also defined in accordance with the DVD-RW specifications (hereafter, the record position is referred to a target position).

Considering the above-mentioned fact, at the time of starting the reproduction of the information recorded on the DVD-RW, it is required that the start processing is done by emitting the light beam to the common detection position outside the embossed area, thereby obtaining the detection signal, after that, shifting the emitted position with the light beam, namely, a light spot, beyond the embossed area, and emitting the light beam to the target position inside the embossed area to obtain the reproduction control signal.

In this case, if the conventional shifting method is employed when the light spot is shifted, it may be considered to count the number of tracks formed on the DVD-RW which the light spot passed during its shift, and then shift the light spot to the target position while recognizing the position on the DVD-RW of the light spot based on the counted result.

However, if the conventional shifting method is applied to the DVD-RW, the number of tracks, whose width in a radius direction and interval are similar to those of a groove track, formed within the embossed area by using phase pits can not be accurately counted depending on a method of detecting and counting the tracks. As a result, the number of passed tracks is indistinct at the time of the shift of the light spot in the embossed area. This results in a problem that the light spot may not be accurately shifted to the target position beyond the embossed area.

SUMMARY OF THE INVENTION

The present invention is proposed in view of the above-mentioned problems. It is therefore an object of the present invention to provide a servo control apparatus and a servo control method which even if a light spot needs to be shifted beyond an embossed area, can shift it to a target position accurately and surely, and an information. reproducing apparatus including the same.

The above object of the present invention can be achieved by a servo control apparatus carrying out a servo control when information is reproduced by using a light beam on an information record medium in accordance with the present invention. The information record medium has a signal change area where a detection signal obtained from the information record medium on the basis of reflection light of the light beam indicates a different characteristics compared with that of the detection signal obtained during the reproduction of the information. The servo control apparatus includes: a detecting device which detects a position of a light spot formed by the light beam except the signal change area on the information record medium; and a shifting device which shifts the light spot beyond the signal change area to a predetermined target position to be radiated with the light beam, which is positioned in another side of the signal change area on the information record medium, on the basis of the detected position.

According to the apparatus, the detecting device detects the position of the light spot formed by the light beam except the signal change area on the information record medium. Then the shifting device shifts the light spot beyond the signal change area to a predetermined target position to be radiated with the light beam on the basis of the detected position. The target position is positioned in another side of the signal change area on the information record medium Therefore, the light spot is shifted beyond the signal change area where the detection signal indicates a different characteristics compared with that of the detection signal obtained during the reproduction of the information so that the servo control is disturbed. As a result, the light spot can be sent to the target position accurately and surely.

In one aspect of the servo control apparatus of the present invention, a sub-detecting device detects that the light spot is shifted from the detected position to an end of the signal change area. Then the shifting device shifts the light spot from the end to the target position beyond the signal change area after the light spot is shifted to the end.

According to this aspect, after a light spot is shifted to the end, it is shifted to a target position. Therefore, it can be surely shifted beyond a signal change area.

In another aspect of the servo control apparatus of the present invention, the detecting device detects the position as an address information on the information record medium in which the information is recorded.

According to this aspect, even if a position of an information record medium itself is changed, it is possible to surely detect a position of a light spot and send to a target position.

The above object of the present invention can be achieved by a servo control apparatus carrying out a servo control when information is reproduced by using a light beam on an information record medium in accordance with the present invention. The information record medium has a signal change area where a detection signal obtained from the information record medium on the basis of reflection light of the light beam indicates a different characteristics compared with that of the detection signal obtained during the reproduction of the information. The servo control apparatus includes: a detecting device which detects an end of the signal change area; and a shifting device which shifts a radiating position of the light beam beyond the signal change area to a predetermined target position to be radiated with the light beam, which is positioned in opposite side of the signal change area to a side where the end is detected on the information record medium, on the basis of the detected end.

According to the apparatus, the detecting device detects the end of the signal change area. Then the shifting device shifts the. radiating position of the light beam beyond the signal change area to a predetermined target position to be radiated with the light beam on the basis of the detected end. The target position is positioned in opposite side of the signal change area to a side where the end is detected on the information record medium.

Therefore, the light spot is shifted beyond the signal change area where the detection signal indicates a different characteristics compared with that of the detection signal obtained during the reproduction of the information so that the servo control is disturbed. As a result, the light spot can be sent to the target position accurately and surely.

In another aspect of the servo control apparatus of the present invention, the detection signal obtained in the signal change area is an RF signal corresponding to the information, and a level of the RF signal is dropped in the signal change area as compared with that of RF signal obtained during the reproduction of the information.

According to this aspect, even if there is the signal change area in which the level of the RF signal is dropped in the information record medium, the light beam can be surely sent to the target position beyond the signal change area.

In another aspect of the servo control apparatus of the present invention, the shifting device comprises a stepping motor.

According to this aspect, it is possible to send the radiating position of the light beam to the target position while controlling at an accuracy of a step in the stepping motor.

In another aspect of the servo control apparatus of the present invention, the information record medium is DVD-RW, and a phase pit is formed within the signal change area.

According to this aspect, even if there is the signal change area in which the phase pit is formed on DVD-RW, the light beam can be surely sent to the target position beyond it.

The above object of the present invention can be achieved by an information reproducing apparatus in accordance with the present invention. The information reproducing apparatus includes the above-mentioned servo control apparatus and a reproducing device which reproduces the information from the information record medium on the basis of the detection signal.

According to the apparatus, the servo control apparatus carries out the servo control in the above-mentioned manner. Then, reproducing device reproduces the information from the information record medium on the basis of the detection signal.

Therefore, by sending the light beam to the target position accurately and surely, it is possible to surely detect and reproduce an information recorded at the target position and the like.

The above object of the present invention can be achieved by a servo control method of carrying out a servo control when information is reproduced by using a light beam on an information record medium in accordance with the present invention. The information record medium has a signal change area where a detection signal obtained from the information record medium on the basis of reflection light of the light beam indicates a different characteristics compared with that of the detection signal obtained during the reproduction of the information. The information reproducing method includes the process of detecting a position of a light spot formed by the light beam except the signal change area on the information record medium, and the process of shifting the light spot beyond the signal change area to a predetermined target position to be radiated with the light beam, which is positioned in another side of the signal change area on the information record medium, on the basis of the detected position.

According to the method, the position of the light spot formed by the light beam in one side of the signal change area on the information record medium is detected. Then, the light spot is shifted beyond the signal change area to the predetermined target position to be radiated with the light beam on the basis of the detected position. The target position is positioned in another side of the signal change area on the information record medium.

Therefore, since the light spot is shifted beyond the signal change area in which the detection signal indicates the different characteristics compared with that of the detection signal obtained during the reproduction of the information so that a servo control is disturbed, the light spot can be sent to a target position accurately and surely.

The above object of the present invention can be achieved by a servo control method of carrying out a servo control when information is reproduced by using a light beam on an information record medium in accordance with the present invention. The information record medium has a signal change area where a detection signal obtained from the information record medium on the basis of reflection light of the light beam indicates a different characteristics compared with that of the detection signal obtained during the reproduction of the information. The information reproducing method includes the process of detecting an end of the signal change area, and the process of shifting a radiating position of the light beam beyond the signal change area to a predetermined target position to be radiated with the light beam, which is positioned in opposite side of the signal change area to a side where the end is detected on the information record medium, on the basis of the detected end.

According to the method, the end of the signal change area is detected. Then, the light spot is shifted beyond the signal change area to the predetermined target position to be radiated with the light beam on the basis of the detected end the target position is positioned in opposite side of the signal change area to a side where the end is detected on the information record medium.

Therefore, after the end of the signal change area, in which the detection signal indicates the different characteristics compared with that of the detection signal obtained during the reproduction of the information so that a servo control is disturbed, is detected, the radiating position of the light beam is shifted to the target position beyond the signal change area. As a result, the light beam can be sent to the target position accurately and surely

DETAILED DESCRIPTION OF THE PREFERRED EMBODIMENTS (I) Embodiment

A preferred embodiment of the present invention will be explained below with reference to FIGS. 1 to 4. The following embodiment is an embodiment in which the present invention is applied to a servo control in an information reproducing apparatus for reproducing information recorded on the above-mentioned DVD-RW serving as an information record medium.

Figure 1:
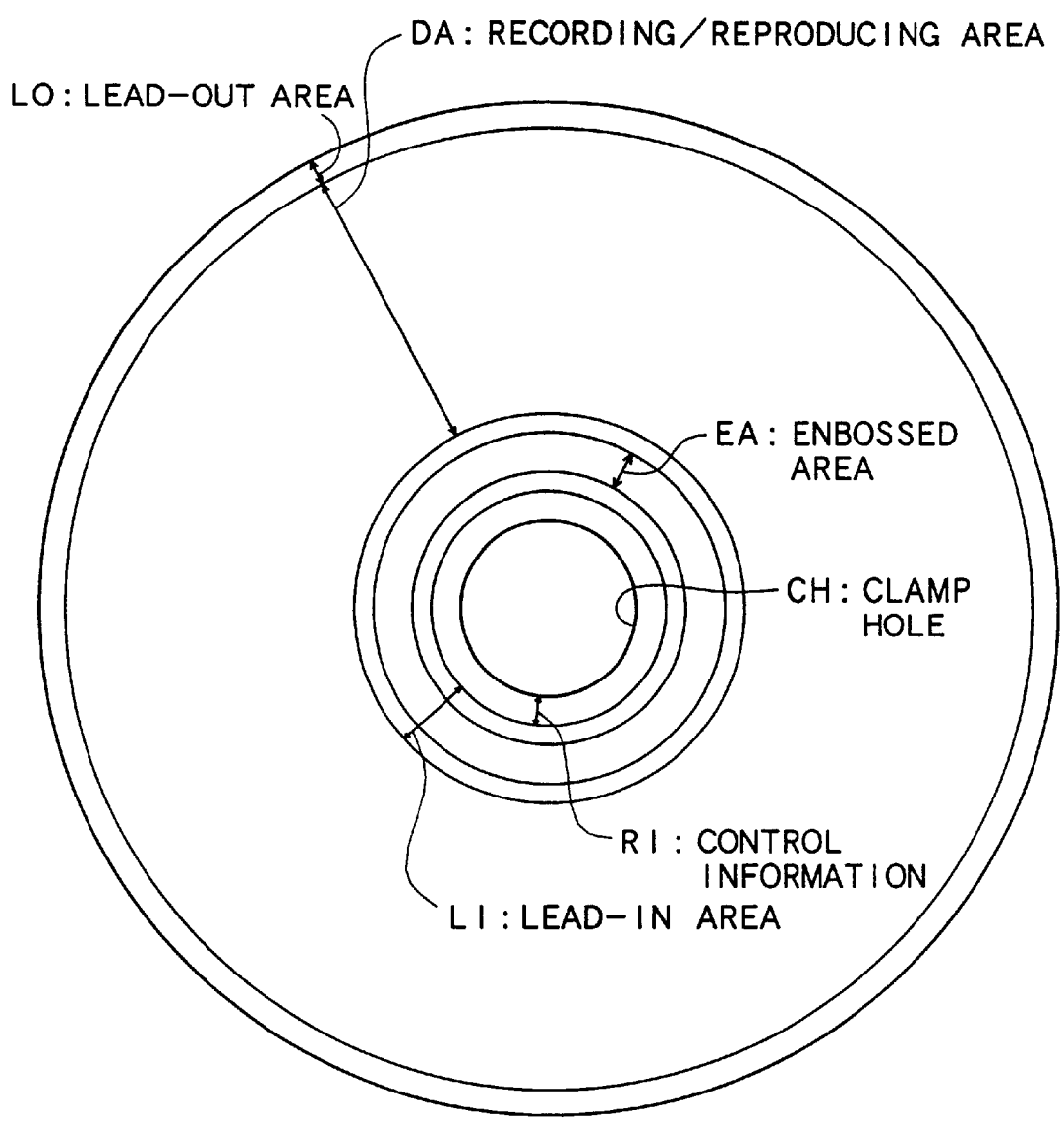
FIG. 1 is a plan view showing DVD-RW according to an embodiment.
Figure 2:
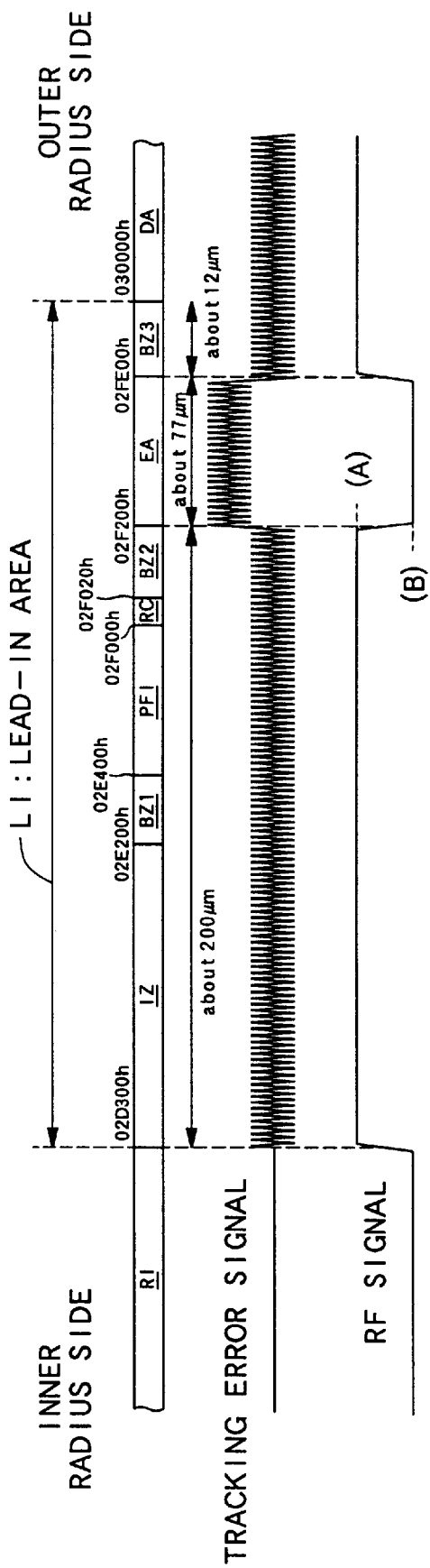
FIG. 2 is a view showing a recording format of DVD-RW.
Figure 3:
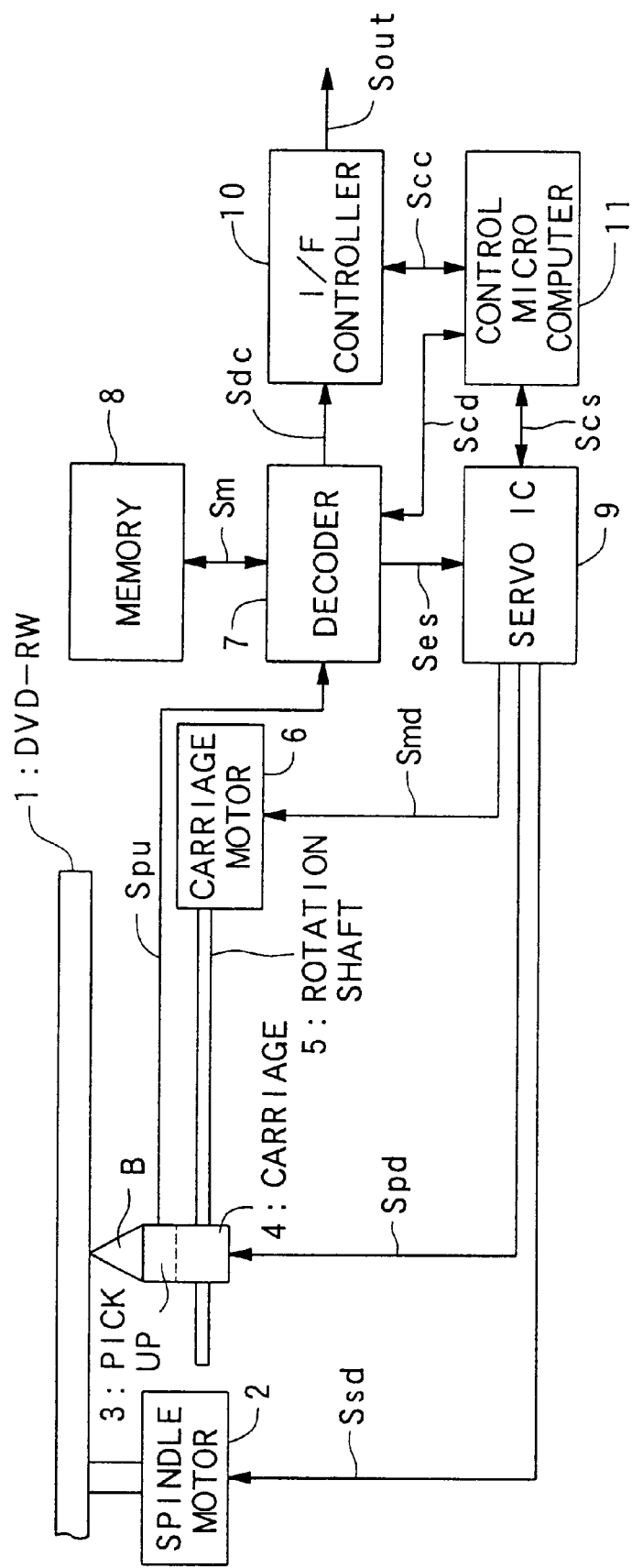
FIG. 3 is a block diagram showing a schematic configuration of an information reproducing apparatus according to the embodiment.
Figure 4:
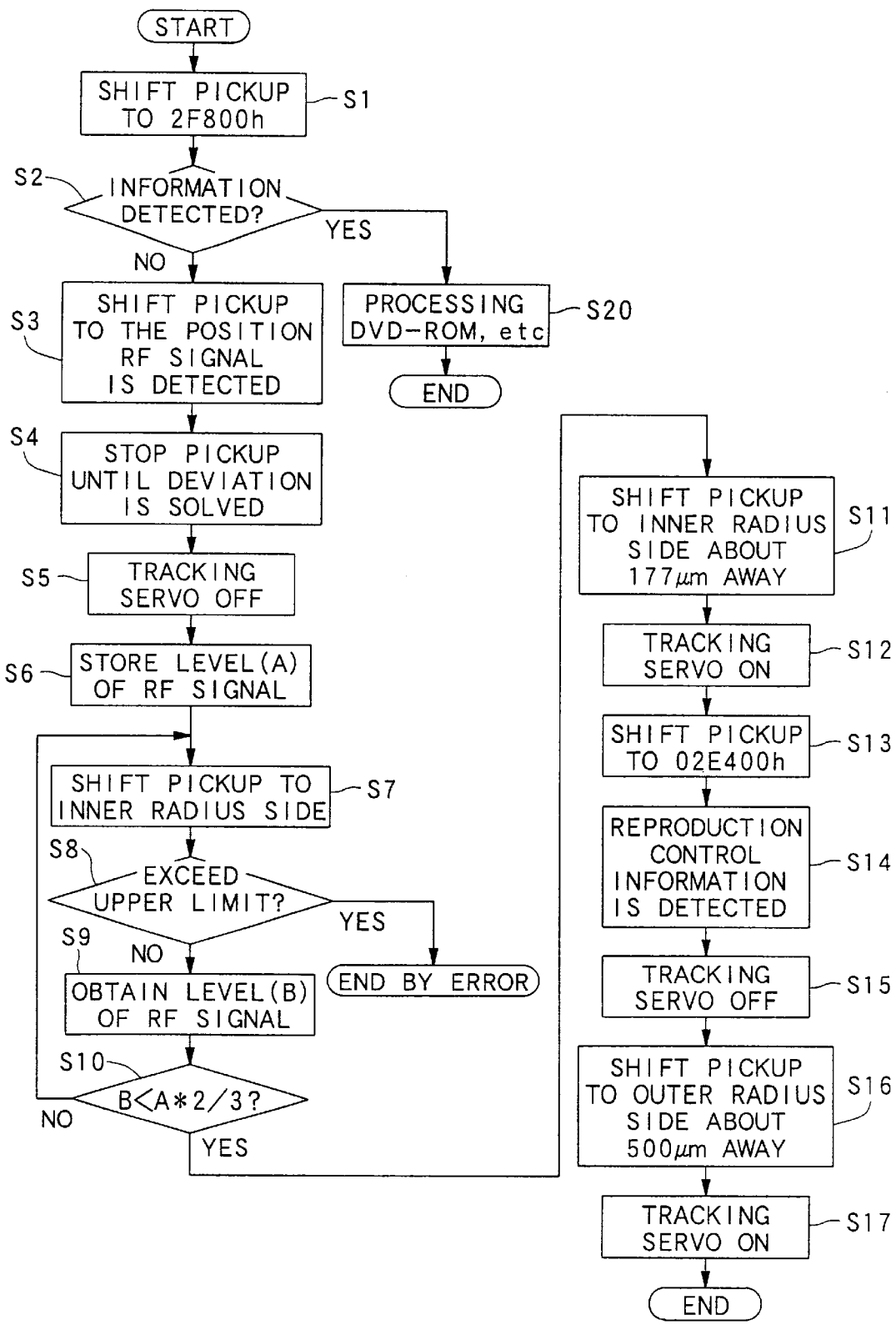
FIG. 4 is a flowchart showing a servo control according to the embodiment.

FIG. 1 is a plan view of DVD-RW in which information has been recorded according to the embodiment. FIG. 2 is a view showing a part of a recording format in the DVD-RW in which the information has been recorded. FIG. 3 is a block diagram showing the schematic configuration of the information reproducing apparatus according to the embodiment. FIG. 4 is a flowchart showing a servo control processing according to the present invention.

As shown in FIG. 1, in a DVD-RW 1 according to the embodiment, a clamp hole CH used when it is fixed to a later-described spindle motor, which is a spindle motor for rotating the DVD-RW 1 at a preset rotation number, within the information reproducing apparatus is made at its center after the information is recorded.

A control information area. RI in which control information used for recording record information on the DVD-RW 1 and reproducing it from the DVD-RW 1, specifically setting information for setting strength of a light beam to record and reproduce it, record control information used for recording it, etc., is recorded; a lead-in area LI in which start information for starting to record and reproduce it, etc., is recorded; and a lead-out area LO in which end information indicative of an end of recording it in the DVD-RW 1 is recorded, are formed from an inner radius side to an outer radius side of the DVD-RW 1.

An embossed area EA serving as a signal change area is included within the lead-in area LI. The embossed area EA is an area on the DVD-RW 1 corresponding to an area where the control information for reproduction control is recorded in the read-only DVD. The embossed area EA is provided as a non-recordable area to prevent unauthorized duplication of the record information on the DVD-RW 1 as mentioned above.

A recording format in the lead-in area LI of the DVD-RW 1 after the information is recorded in a recording/ reproducing area DA will be described below with reference to FIG. 2.

As shown in FIG. 2, an initial zone IZ where only zero data ([00h (hereafter "h" denotes hexadecimal notation)]), is recorded; a first buffer zone BZ1 where only zero data is recorded; a reproduction control zone PFI where the reproduction control information to be obtained in the information reproducing apparatus after the above-mentioned start processing; a reference code zone RC where a reference code including the start information, etc., is recorded; a second buffer zone BZ2 where only zero data is recorded; the embossed area EA; and a third buffer zone BZ3 having the function similar to that of the first buffer zone BZ1 or the second buffer zone BZ2 are formed from an inner radius side to an outer radius side of the lead-in area LI, after the information is recorded.

A phase pit having preset depth is formed in the embossed area EA. Then, it is designed such that information can not be recorded in the embossed area EA since the light beam for recording the information is diffracted by this phase pit.

Specifically, the DVD-RW specifications specifies address information on the DVD-RW 1 in each zone within the lead-in area LI as follows: the initial zone IZ is formed on areas of addresses [02D300h] to [02E200h]; the first buffer zone BZ1 is formed in areas of addresses [02E200h] to [02E400h]; the reproduction control zone PFI is formed in areas of addresses [02E400h] to [02F000h]; the reference code zone RC is formed in areas of addresses [02F000h] to [02F020h]; the second buffer zone BZ2 is formed in areas of addresses [02F020h] to [02F000h]; the embossed area EA is formed in areas of addresses [02F200h] to [02FE00h]; and the third buffer zone BZ3 is formed in areas of addresses [02FE00h] to [030000h].

Moreover, the DVD-RW specifications specifies width in a radius direction of each zone as shown in a top stage of FIG. 2: width from an end of an inner radius side of the initial zone IZ to an end of an inner radius side of the embossed area EA is assumed to be about 200 μm; width of the embossed area EA is assumed to be about 77 μm; and width of the third buffer zone BZ3 is assumed to be about 12 μm.

The optical properties of the embossed area EA will be described below with reference to FIG. 2.

Firstly, a tracking error signal used for a tracking servo control at a time of information reproduction, which is tracking servo control based on a delay phase difference DPD (Differential Phase Detection) method used by a later-described information reproducing apparatus, indicates the following property. The embossed area EA is formed as the non-recordable area having the above-mentioned configuration. Namely, it is a non-recordable area in which phase pits are formed in accordance with a phase pit forming scheme, which is different from a phase change scheme that is an information recording scheme used in an area within the DVD-RW 1 except the embossed area EA. Thus, the tracking error signal generated by using the delay phase difference DPD method optimized for the phase change scheme indicates a property in which its central level is shifted to a high level side or a low level side within the embossed area EA, as shown in a middle portion of FIG. 2. The example shown in the middle portion of FIG. 2 indicates the case of the shift to the high level side.

Secondly, an RF signal corresponding to an information recorded on the DVD-RW 1 indicates a property that its level drops within the embossed area EA for the same reason as in the case of the tracking error signal. A level denoted by a symbol B in a bottom portion of FIG. 2 is a level less than about two-thirds of that denoted by a symbol A.

Next, the configuration. and operation of information reproducing apparatus according to the embodiment will be described with reference to FIGS. 3 and 4.

As shown in FIG. 3, an information reproducing apparatus S for reproducing information recorded on the DVD-RW 1 is provided with a spindle motor 2, a pickup 3, a carriage 4, a rotation shaft 5, a carriage motor 6 serving as a shifting device, a decoder 7 serving as a reproducing device, a memory 8, an servo IC 9 serving as a detecting device, a shifting device and a sub-detecting device, an I/F (Inter Face) controller 10 and a control micro computer 11.

The schematic operation will be described below.

At first, the pickup 3 radiates an information reproducing light beam B to the DVD-RW 1 that is rotated at a predetermined rotation number by the spindle motor 2 run by a later-described spindle drive signal Ssd, receiving its reflection light, accordingly generating a detection signal Spu corresponding to the information to be reproduced, and providing it as an output to the decoder 7.

At this time, the light beam B is condensed onto an information record surface on the DVD-RW 1 by an objective lens in the pickup 3, which is not shown in FIG. 3, and a light spot is formed on the information record surface.

Then, the objective lens is shifted in the vertical or horizontal direction to the information record surface by an actuator, which supports and shifts the objective lens, is not shown in FIG. 3, and is run by a later-described pickup servo signal Spd, so that the gap between a focal point of the light beam B and a position of a groove track on the surface in the vertical direction to the surface and the gap between the focal point and the position of the groove track in the horizontal direction to the surface are compensated for. Namely, tracking servo control and focus servo control is performed. Then, the information is reproduced while the control is performed.

If the necessity of further shifting the focal point beyond the limits of shifting in the radius direction of the objective lens arises in the tracking servo control with regard to the radius direction of the DVD-RW 1, the tracking servo control is continued since the carriage 4 supporting the pickup 3 is shifted in the radius direction, which is the left or right direction of FIG. 3, while supporting the pickup 3.

The shift of the carriage 4 is implemented since the carriage motor 6 run by a later-described motor drive signal Smd rotates the threaded rotation shaft 5 so that the carriage 4 having a partial nut engaged with the thread on the rotation shaft 5 is shifted in a direction parallel to a central axis of the rotation shaft 5 .

The carriage motor 6 is provided with a so-called stepping motor. Its accuracy of shift is assumed to be about 11 μm/one step.

Next, the decoder 7, while sending a control signal Scd to and receiving it from the control micro computer 11, and also sending necessary information as a memory signal Sm to and receiving it from the memory 8, extracts a reproduction signal Sdc corresponding to information recorded on the DVD-RW 1 from the detection signal Spu; provides an output to the I/F controller 10; extracts the so-called focus error signal and the tracking error signal from the detection signal Spu; generates an error signal Ses including them, and provides an output to the servo IC 9. The focus error signal indicates the gap between the focal point of the light beam B and a position of the information track in the vertical direction to the information record surface. Further, the tracking error signal indicates the gap between the focal point and the position in the parallel direction to the surface.

Accordingly, the I/F controller 10, while sending a control signal Scc to and receiving it from the control micro computer 11, performs a preset processing for interfacing to input the reproduction signal Sdc and to generate an output signal Sout corresponding to the information recorded on the DVD-RW 1, and then provides an output to an external personal computer, etc.

The servo IC 9 where the error signal Ses is provided, while sending the control signal Scs to and receiving it from the control micro computer 11, generates the pickup servo signal Spd for driving the actuator in the pickup 3 in accordance with the focus error signal and the tracking error signal included in the error signal Ses, provides an output to the pickup 3, generates the spindle drive signal Ssd for controlling the rotation of the spindle motor 2, and then provides an output to the spindle motor 2.

The above-mentioned delay phase difference DPD method is used in the tracking servo control among them.

In addition to those operations, the servo IC 9 generates the motor drive signal Smd, in order to shift the carriage 4 in the radius direction of the DVD-RW 1, in accordance with the tracking error signal, and provides an output to the carriage motor 6.

The above-mentioned series of the operations are the operation when the information recorded in the record reproduction area DA of the DVD-RW 1 is reproduced. However, before the reproduction is started, the start processing of starting each servo control through the radiation of the light beam B to a common detection position, which is a position located about 25 mm away from a center of the DVD-RW 1, and a detection processing of detecting the reproduction control information recorded in the reproduction control zone PFI are carried out as described later. Thus, the detected reproduction control information is used to carry out the above-mentioned series of the reproduction operations.

The start processing, the detection processing of detecting the reproduction control information, etc. according to the present invention will be described below with reference to FIG. 4. The start processing, the detection processing, etc. are the processing mainly carried out by the servo IC 9.

In the start processing, the detection processing, etc., as shown in FIG. 4, in order to detect whether an optical disc loaded in the information reproducing apparatus S is the DVD-RW 1 or any other optical disc, a tracking servo control is first turned on. Then the carriage 4 is shifted to a position in the area where the DVD-RW specifications specifies the embossed area EA is formed, for example, a position of the address [2F800h] shown in FIG. 4. Further, the light beam B is radiated to the position after the shift (Step S1).

Then, it is determined whether or not any information can be detected from a reflection light of the radiated light beam B (Step S2). If the position is in the embossed area EA, any information can not be detected. Therefore, if any information can be detected (Step S2; Yes), it is determined that the currently loaded optical disc is a DVD-ROM or any other disc except the DVD-RW 1. Then, processing corresponding to the currently loaded optical disc is carried out. (Step S20), and the start processing is terminated.

On the other hand, if any information can not be detected in the determination at the step S2 (Step S2; No), it is determined that the embossed area EA is formed at the position to which the light beam B is currently being radiated and that the currently loaded optical disc is the DVD-RW 1. Next, the pickup 3 supported by the carriage 4 is shifted to the common detection position on the DVD-RW 1 in which the RF signal should be detected as the detection signal Spu (Step S3). Moreover, in order to solve a deviation of the objective lens (namely, a deviation from a center of a shift range of the objective lens in the carriage 4), the carriage 4 is temporarily stopped at the position.

The processing at the step S3 will be specifically explained as follows. the carriage 4 is positioned, for example, at the innermost radius position of the DVD-RW 1. Then, the carriage 4 is shifted by a preset stepping amount, which is a stepping amount in the rotation drive of the carriage motor 6, corresponding to a length of 25 mm from the position. Accordingly, the pickup 3 is shifted to the common detection position.

After the deviation of the objective lens is solved, the tracking servo control is turned off. Accordingly, the objective lens is set at a substantially neutral position in a radius direction (Step S5). Moreover, a level of an RF signal included in the detection signal Spu obtained at that time is detected. Specifically, a level of an envelope generated by the RF signal is detected (Step S6). Then, the detected level is defined as a value A, and stored in a memory in the servo IC 9, which is not shown in FIG. 3.

The level A of the stored RF signal corresponds to a level denoted by a symbol A in a bottom portion of FIG. 2.

Next, the rotation shaft 5 is rotated by one step in the carriage motor 6. The carriage 4 is shifted to the inner radius side of the DVD-RW 1 by a distance corresponding to the one step (Step S7).

Then, it is determined whether or not the amount of shift from the position of the pickup 3 in the processing at the step S1 exceeds a preset upper limit, for example, 800 μm (Step S8). The later-described steps S9, S10 employ loop processing in which the operational flow returns back to the step S7. Therefore, for example, if it is determined that any information can not be accidentally detected because of an influence such as flaw on a surface, etc., in the determination at the. step S2 although the loaded optical disc is the DVD-ROM (Step S2; No), the shift of the carriage 4 to the inner radius side is permanently continued since the embossed area EA is not present in the DVD-ROM. However, The processing at the step S8 prevent this trouble from happening.

Thus, if the amount of shift exceeds the upper limit in the determination at the step S8 (Step S8; YES), this situation implies the above-mentioned error state. Hence, an error processing, such as a display indicating its fact, etc., is carried out, and the processing is terminated.

On the other hand, if the amount of shift of the carriage 4 does not exceed the upper limit in the determination at the step S8 (Step S8 NO), the error state is not induced. Then, a level of an RF signal obtained at a position where the carriage 4 is shifted by a distance corresponding to the one step is detected, and the detected level is stored as a value B in a memory in the servo IC 9, which is not shown in FIG. 3 (Step S9).

The value B stored in the memory at the step S9 is compared with the value A stored in the memory at the step S6. Then, it is determined whether or not the value B is less than two-thirds of the value A, namely, the level of the RF signal is dropped to the level B shown in the bottom portion of FIG. 2 (Step S10).

In this determination at the step S10, in other words, it is determined whether or not a position of a light spot shifted from the common detection position to the inner radius side arrives at an end on an outer radius side of the embossed area EA, which is the position represented by the address [02FE00h] in the top portion of FIG. 2.

If the value B is not less than two-thirds of the value A in the determination at the step S10 (Step S10; NO), it is determined that the position of the light spot does not still arrive at the end on the outer radius side. Then, the operational flow returns back to the step S7, and the processing at the steps S7 to S10 is repeated in order to retrieve the end on the outer radius side.

On the other hand, if the value B is less than two-thirds of the value A in the determination at the step S10 (Step S10; YES), it is determined that the position of the light spot arrives at the end on the outer radius side. Next, the carriage motor 6 is driven so as to shift the carriage 4 straight to the vicinity of a position of the end on the inner radius side of the reproduction control zone PFI from a current position of the light spot (Step S11). The position of the end on the inner radius side of the reproduction control zone PFI is a position of the address [02E400h] in the case shown in FIG. 2, and this position corresponds to the above-mentioned target position. Then, the tracking servo control is turned on at the position after the shift (Step S12). At the step S11, the carriage 4 is shifted by about 177 μm in the case shown in FIG. 2. The value of 177 μm equals the sum of a width of 77 μm in the radius direction of the embossed area EA and 100 μm.

An address of the current position of the light spot is obtained at the situation that the tracking servo control is turned on. From its position, the light spot is further shifted precisely to the position of the end on the inner radius side of the reproduction control zone PFI (Step S13). The light spot is shifted from it to the outer radius side of the DVD-RW 1, so that the reproduction control information recorded in the reproduction control zone PFI is detected (Step S14). Then, the tracking servo control is again turned off (Step S15).

After that, the light spot is shifted to a position on the outer radius side about 500 μm away that is a position within the record reproduction area DA (Step S16). Then, the tracking servo control is turned off (Step S17). After that, the usual information reproducing processing is done.

As mentioned above, the light spot is shifted beyond the embossed area EA, in accordance with the position of the light spot detected in the processing at Step S1 (Step S11). Thus, by sending the light spot to the vicinity of the target position accurately and surely, it is possible to surely obtain the reproduction control information and reproduce the information.

Also, after the light spot is sent to the end on the outer radius side of the embossed area EA (Step S10; YES), it is shifted to the vicinity of the target position. Thus, it can be surely shifted beyond the embossed area EA.

Moreover, the position of the light spot is detected as the address information on the DVD-RW 1 at the step S1. Thus, even if the position of the DVD-RW 1 itself is varied because of the above-mentioned deviation, etc., the position of the light spot can be surely detected and accordingly sent to the vicinity of the target position.

Furthermore, even if there is the embossed area EA in which the level of the RF signal is dropped in the DVD-RW 1, the light beam can be surely sent beyond the embossed area EA to the vicinity of the target position.

Also, the carriage motor 6 is the stepping motor. Thus, the light spot can be sent to the vicinity of the target position while it is controlled at the accuracy of the step in the carriage motor 6.

(II) Variation

The variation according to the present invention will be described below.

In the above-mentioned embodiment, the tracking servo control is turned off (refer to the step S5 of FIG. 4). Then, while the position of the objective lens within the pickup 3 is held at the substantially neutral position in the radius direction, the processing for retrieving the end on the outer radius side of the embossed area EA (refer to the steps S7 to S10 of FIG. 4) and the processing for shifting the carriage 4 to the vicinity of the target position (refer to the step S11 of FIG. 4) are carried out. Moreover, at the step S11, the shift to the vicinity of the target position is done by the shift of the carriage 4 driven by the carriage motor 6. In addition, this shift operation may be designed as follows. That is, when the tracking servo control is turned off (refer to the step S5 of FIG. 4), the objective lens is fixed to a preset position on the outer radius side. At this state, the processing for retrieving the end on the outer radius side of the embossed area EA is carried out (refer to the steps S7 to S10 of FIG. 4). Then, while the carriage 4 is fixed to the position at the time of the retrieval, the objective lens is shifted beyond the embossed area EA to the inner radius side. Accordingly, the light spot is shifted to the vicinity of the target position.

Even in this case, the present invention can produce the effect similar to that of the embodiment.

Also, in the embodiment and the variation, the delay phase difference DPD method is used for the tracking servo control scheme. In addition, the present invention can be applied to the case that any other method, in which an offset is contained in a tracking error signal because of a change of a pit shape, is used for the tracking servo control scheme, such as a so-called DHD (Double HeteroDyne) method and the like.

Moreover, in the embodiment and the variation, the position within the DVD-RW 1 of the embossed area EA and the width in the radius direction are defined in advance on the basis of the DVD-RW specifications. However, the present invention is designed so as to shift the light spot to the vicinity of the target position after the detection of the end on the outer radius side of the non-recordable area, which includes another non-recordable area formed besides the embossed area EA. Thus, besides the case of the embodiment or the variation, the present invention can be applied to an embodiment where the light spot can be surely shifted to the vicinity of the target position, for example, even if only the width in the radius direction of the non-recordable area is defined in advance and the position within the optical disc is varied.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000-56065 filed on Feb. 28, 2000 including the specification, claims, drawings and summary is incorporated herein by reference in its entirety.

What is claimed is:

1. A servo control apparatus for carrying out a servo control when information is reproduced by using a light beam on an information record medium having a signal change area in which a detection signal obtained from the information record medium on the basis of reflection light of the light beam indicates a different characteristics compared with that of the detection signal obtained during the reproduction of the information, comprising:

a detecting device for detecting a position of a light spot formed by the light beam except the signal change area on the information record medium; and a shifting device for shifting the light spot beyond the signal change area to a predetermined target position to be radiated with the light beam, which is positioned in another side of the signal change area on the information record medium, on the basis of the detected position.

2. The servo control apparatus according to claim 1, further comprising a sub-detecting device for detecting that the light spot is shifted from the detected position to an end of the signal change area, wherein the shifting device shifts the light spot from the end to the target position beyond the signal change area after the light spot is shifted to the end.

3. The servo control apparatus according to claim 1, wherein the detecting device detects the position as an address information on the information record medium in which the information is recorded.

4. The servo control apparatus according to claim 1, wherein the detection signal obtained in the signal change area is an RF signal corresponding to the information, and a level of the RF signal is dropped in the signal change area as compared with that of RF signal obtained during the reproduction of the information.

5. The servo control apparatus according to claim 1, wherein the shifting device comprises a stepping motor.

6. The servo control apparatus according to claim 1, wherein the information record medium is DVD-RW, and a phase pit is formed within the signal change area.

7. A servo control apparatus for carrying out a servo control when information is reproduced by using a light beam on an information record medium having a signal change area in which a detection signal obtained from the information record medium on the basis of reflection light of the light beam indicates a different characteristics compared with that of the detection signal obtained during the reproduction of the information, comprising:

a detecting device for detecting an end of the signal change area; and a shifting device for shifting a radiating position of the light beam beyond the signal change area to a predetermined target position to be radiated with the light beam, which is positioned in opposite side of the signal change area to a side where the end is detected on the information record medium, on the basis of the detected end.

8. The servo control apparatus according to claim 7, wherein the detection signal obtained in the signal change area is an RF signal corresponding to the information, and a level of the RF signal is dropped in the signal change area as compared with that of RF signal obtained during the reproduction of the information.

9. The servo control apparatus according to claim 7, wherein the shifting device comprises a stepping motor.

10. The servo control apparatus according to claim 7, wherein the information record medium is DVD-RW, and a phase pit is formed within the signal change area.

11. An information reproducing apparatus comprising:

a servo control apparatus for carrying out a servo control when information is reproduced by using a light beam on an information record medium having a signal change area in which a detection signal obtained from the information record medium on the basis of reflection light of the light beam indicates a different characteristics compared with that of the detection signal obtained during the reproduction of the information, comprising:

a detecting device for detecting a position of a light spot formed by the light beam except the signal change area on the information record medium; and a shifting device for shifting the light spot beyond the signal change area to a predetermined target position to be radiated with the light beam, which is positioned in another side of the signal change area on the information record medium, on the basis of the detected position; and a reproducing device for reproducing the information from the information record medium on the basis of the detection signal.

12. An information reproducing apparatus comprising:

a servo control apparatus for carrying out a servo control when information is reproduced by using a light beam on an information record medium having a signal change area in which a detection signal obtained from the information record medium on the basis of reflection light of the light beam indicates a different characteristics compared with that of the detection signal obtained during the reproduction of the information, comprising:

a detecting device for detecting an end of the signal change area; and a shifting device for shifting a radiating position of the light beam beyond the signal change area to a predetermined target position to be radiated with the light beam, which is positioned in opposite side of the signal change area to a side where the end is detected on the information record medium, on the basis of the detected end; and a reproducing device for reproducing the information from the information record medium on the basis of the detection signal.

13. A servo control method of carrying out a servo control when information is reproduced by using a light beam on an information record medium having a signal change area in which a detection signal obtained from the information record medium on the basis of reflection light of the light beam indicates a different characteristics compared with that of the detection signal obtained during the reproduction of the information, comprising the processes of:

detecting a position of a light spot formed by the light beam except the signal change area on the information record medium; and shifting the light spot beyond the signal change area to a predetermined target position to be radiated with the light beam, which is positioned in another side of the signal change area on the information record medium, on the basis of the detected position.

14. A servo control method of carrying out a servo control when information is reproduced by using a light beam on an information record medium having a signal change area in which a detection signal obtained from the information record medium on the basis of reflection light of the light beam indicates a different characteristics compared with that of the detection signal obtained during the reproduction of the information, comprising the processes of:

detecting an end of the signal change area; and shifting a radiating position of the light beam beyond the signal change area to a predetermined target position to be radiated with the light beam, which is positioned in opposite side of the signal change area to a side where the end is detected on the information record medium, on the basis of the detected end.

* * * * *